(12) United States Patent
Menssen et al.

(10) Patent No.: US 9,205,361 B2
(45) Date of Patent: Dec. 8, 2015

(54) AIR FILTER ELEMENT, AIR FILTER HOUSING AND AIR FILTER SYSTEM

(71) Applicant: MANN+HUMMEL GMBH, Ludwigsburg (DE)

(72) Inventors: Joerg Menssen, Tamm (DE); Stefan Becker, Mannheim (DE); Kai Hilarius, Roemerberg (DE); Klaus-Dieter Ruhland, Meckenheim (DE)

(73) Assignee: Mann + Hummel GmbH, Ludwigsburg (DE)

( * ) Notice: Subject to any disclaimer, the term of this patent is extended or adjusted under 35 U.S.C. 154(b) by 45 days.

(21) Appl. No.: 13/970,013

(22) Filed: Aug. 19, 2013

(65) Prior Publication Data

US 2014/0047808 A1 Feb. 20, 2014

Related U.S. Application Data

(63) Continuation of application No. PCT/EP2012/052697, filed on Feb. 16, 2012.

(30) Foreign Application Priority Data

Feb. 17, 2011 (DE) .......................... 10 2011 011 595

(51) Int. Cl.
*B01D 46/24* (2006.01)
*B01D 46/52* (2006.01)
*B01D 50/00* (2006.01)
*F02M 35/024* (2006.01)
*B01D 46/10* (2006.01)

(52) U.S. Cl.
CPC .......... *B01D 46/2411* (2013.01); *B01D 46/106* (2013.01); *B01D 46/2403* (2013.01); *B01D 46/2414* (2013.01); *B01D 46/521* (2013.01); *B01D 50/002* (2013.01);

(Continued)

(58) Field of Classification Search
CPC ........... B01D 46/2411; B01D 46/2414; B01D 2275/206; B01D 2275/208; B01D 46/0002; B01D 46/106; B01D 46/2403; B01D 46/521
USPC .................................... 55/498, 503, 510, 529
See application file for complete search history.

(56) References Cited

U.S. PATENT DOCUMENTS

2007/0062887 A1  3/2007  Schwandt
2007/0157589 A1* 7/2007  Haberkamp et al. ............ 55/498

(Continued)

FOREIGN PATENT DOCUMENTS

DE  1611083 A1   5/1971
DE  29806916 U1  7/1998

(Continued)

OTHER PUBLICATIONS

Machine translation of FR 2214505 dated Sep. 1974.*

(Continued)

*Primary Examiner* — Robert Clemente
(74) *Attorney, Agent, or Firm* — James Hasselbeck (57) ABSTRACT

A filter element (1) for an air filter (30) has a tubular filter medium (2), the annular cross-section of which encloses an interior (6) of the filter element and which has an inner wall (7) that adjoins the interior of the filter element and that extends in the form of at least one convex arch (8) and at least two concave arches (9), the concave arch (9) being located between two convex arches (8) such that the interior (6) of the filter element has a constriction (11) in the area of the concave arch (9), the constriction (11) being adjoined by two wide zones (12) of the interior of the filter element.

9 Claims, 10 Drawing Sheets

(52) U.S. Cl.
CPC ... *F02M 35/02416* (2013.01); *B01D 2265/028* (2013.01); *B01D 2275/206* (2013.01)

(56) References Cited

U.S. PATENT DOCUMENTS

| | | | |
|---|---|---|---|
| 2010/0107580 A1 | 5/2010 | Thienel | |
| 2010/0162673 A1 | 7/2010 | Grosche | |
| 2010/0186353 A1 | 7/2010 | Ackermann et al. | |

FOREIGN PATENT DOCUMENTS

| DE | 202005003046 U1 | 7/2006 |
|---|---|---|
| DE | 102009013529 A1 | 10/2009 |
| DE | 202008014053 U1 | 3/2010 |
| FR | 2214505 A * | 9/1974 |
| GB | 2017529 A | 10/1979 |
| WO | 2006017790 A1 | 2/2006 |
| WO | 2009106591 A2 | 9/2009 |
| WO | WO 2009106591 A2 * | 9/2009 |

OTHER PUBLICATIONS

Machine translation of WO2009/106591 dated Sep. 2009.*
International Preliminary Report on Patentability for PCT/EP2012/052697 dated Aug. 21, 2013.*

* cited by examiner

AIR FILTER ELEMENT, AIR FILTER HOUSING AND AIR FILTER SYSTEM

CROSS REFERENCE TO RELATED APPLICATIONS

This application is bypass continuation of international patent application no. PCT/EP2012/052697, filed Feb. 16, 2012 designating the United States of America, the entire disclosure of which is incorporated herein by reference. Priority is claimed through PCT/EP2012/052697 to German patent application no. 10 2011 011 595.1, filed Feb. 17, 2011.

TECHNICAL FIELD

The present invention relates to an air filter element, in particular for a multi-stage air filter, which comprises a cyclone precleaner.

BACKGROUND ART

Cyclone filters, also called centrifugal force separator, cyclone or cyclone separator, are used to separate solid or liquid particles contained in gases. In the cyclone filter, gases together with the particles are set into a rotating movement by a corresponding constructive design. The centrifugal forces acting on the particles accelerate them radially outwards. As a result, they are separated from the gas flow, which is guided inwardly and discharged.

Due to the moderate filtration performance with very fine particles compared with other methods, the cyclone filtration is often used as part of a filter chain in a multi-stage filter system. For separating fine dust particles it is, therefore, state-of-the-art to equip the cyclone filter additionally with a conventional filter element. The air pre-cleaned by the cyclone filtration is conveyed through the filter medium of the final filter, in particular of a filter element, wherein impurities of the air are deposited on the filter medium. By so doing, it is possible to enhance the filtration performance of the cyclone filter.

The state-of-the-art filter elements are often insufficiently adapted to cope with the special requirements for being used as main filter element in an air filtering downstream of the cyclone filtration in an air filter. One problem, in particular, is that the air is swirled after the cyclone filtration. As a result, the filter medium of the final filter is flowed through irregularly, thus reducing the filtering effect.

Furthermore, conventional state-of-the-art filter elements are commonly equipped with filter media having cross-sections in even, round or oval shape. As a result, the available filtering surface of the filter medium is not optimal, for a filtering surface as large as possible is advantageous.

DISCLOSURE OF THE INVENTION

It is therefore the objective of the present invention to provide an enhanced filter element and a filter system, in particular for an air filter, which enables it to calm down the air flow in the filter element and to reduce in particular swirling. Furthermore, the filter element shall make available a large filtering surface in conjunction with little mounting space and simple design.

This objective is accomplished by a filter element with the characteristics of the claims.

Accordingly, a filter element for an air filter features a tubular filter medium, the ring-shaped cross section of which encloses a filter element interior space and which features, adjacent to the filter element interior space, an interior wall, which extends in the shape of (seen respectively from outside towards the filter element) at least two convex arches and at least one concave arch, a concave arch being disposed between two convex arches such that in the area of the concave arches a constriction of the filter element interior space is formed, onto which two further filter element interior space areas are adjoiningly positioned.

The shape of the filter element allows to realize a particularly large filtering surface. Conventional filter element comprise in most cases exclusively convex arches, for example as circular endless bellows.

The filter element is preferably adequate to cooperate with a cyclone filter. For example, the filter element can be used as fine filter stage or main filter stage in a two-stage filter.

For example, exactly two convex and two concave arches are provided. Preferably, they are immediately adjacent to each other. Due to the wavelike design of the internal wall, which abuts on the filter element interior space, a larger interior wall surface than with a simple, i.e. end-to-end round cross-section of the filter element, is available. As a result, a larger surface for the air passage and the separation of particles is available, which enhances the filtration performance. Furthermore, the large areas offer the advantage to be used as space for introducing air guide fins, also called blades. The air to be cleaned can be brought into a defined flow status by means of air guide fins for the post-filtering in the filter. As a result, the particle removal can be enhanced during filtering. In this connection, there is on the one hand an interaction between the shape of the filter and the air guide fins used therein, on the other hand sufficient space is required for the air guide fins in the filter. As a result, the flow situation in the filter element interior space can be adapted and swirling can, for example, be calmed down. Furthermore, swirling is also calmed down in the filter element interior space by the arches curved towards the interior of the filter element interior space in the concave sections, for they form a flow resistance and the flow-through cross-section of the interior space in the area of these arches is smaller. In one embodiment, the air guide fins are disposed on a housing cover or a cyclone block and extend into the filter element interior space, in particular into the large areas of the filter element interior space.

Furthermore, flow stabilizing elements can be provided, which extend from a housing, in particular from the housing wall, towards a concave arch of the filter element and which are disposed in the gap between the housing wall and an area of the filter element with a concave arch, when the filter element is installed in the housing. The flow stabilizing elements are designed in one embodiment as ribs, which protrude from the internal wall of the filter housing and extend along the main flow direction relating to the whole filter system between inlet and outlet. This direction can in particular also for example be the mounting direction of the filter element and parallel to the main axes of the circularly or elliptically bent areas of the housing or the filter element or parallel to the fold edges of a filter element with a filter bellows from a zigzag-folded, annularly closed filter bellows.

According to a preferred embodiment, the filter element features an end disk, which sealingly contacts the annular cross-section, and features an opening, which ends in the filter element interior space. The end disk makes it possible to sealingly attach the filter element on the housing of the air filter. To realize this, the end disk is preferably made of a dimensionally stable synthetic material, for example of polyamide or polypropylene.

The end disk features preferably a circumferential even surface for applying for example a sealing on the housing side or with a sealing integrated in or applied on the end disk. The sealing is preferably made of a resilient sealant. Furthermore, the sealing features preferably a circumferential groove, into which a particularly circumferential spring on the housing side engages sealingly. By so doing, a reproducible, exact positioning of the filter element in the housing can be realized. In this way, fluctuations and filter element depending errors in the signal of an air-flow meter downstream of the filter system can be minimized.

Preferably, fastening elements, e.g. locking elements, are also provided on the end disk for attaching the filter element on the air filter housing. This will make it possible to attach the filter element with the rather soft tubular filter medium to the air filter housing. The air filter is in particular designed as single-stage filter, in which only one filter element causes the filtration, or as two- or multi-stage filter with a cyclone filter section and a filter section for the filter element.

Advantageously, the filter element features on the exterior side and/or the interior side in particular basket-type reinforcing ribs for stabilizing the form of the tubular filter medium. The reinforcing ribs make it possible to keep the tubular filter medium in a desired form. To realize this, the reinforcing ribs are particularly preferred made of a dimensionally stable synthetic material, for example of polyamide or polypropylene or of metal.

According to one embodiment, the tubular filter medium is at least partially made of a porous material, in particular of paper or fleece. Paper and fleece allow to filter also fine particles, e.g. fine dust, as they can be contained in the air after a cyclone cleaning, from the (pre-filtered) air. As a result, in conjunction with the cyclone cleaning it is possible to achieve a low-maintenance filtration, which filters significantly more particles than an exclusive cyclone cleaning with the same technical effort.

According to a preferred embodiment, the annular cross-section of the tubular filter medium features a plurality of folds or protrusions, which extend into the filter element interior space. For example, an endless bellows can be created by a zigzag fold. As a result, the effective filtering surface of the tubular filter medium can be further enhanced. This offers the advantage that particles deposited on the filter element surface are distributed on a larger surface and that, as a result, the filter element does not clog so fast.

According to a preferred embodiment, the tubular filter medium has a multilayer design and the folds or protrusions are disposed on a layer that abuts on the filter element interior space.

According to a particular embodiment, the tubular filter medium features a material thickness essentially constant around its circumference. In this embodiment, a simple band-like and folded filter material can be used for the tubular filter medium, which allows a particularly cost-effective manufacturing.

According to a preferred embodiment, the filter housing features inner ribs, which extend in installation direction or mounting direction of the filter element along the filter element. The ribs extend in particular parallel to the folds of the filter element, in case this is formed by a star-shaped folded, annularly closed filter bellows. These ribs extend preferably in the installation direction of the filter element. An accommodated filter element extends then by abutting on the ribs. For example, the totality of the ribs extending inwardly reproduces at least partially an outer cross-sectional contour of the filter element. Using the ribs avoids using an inappropriate filter medium, that makes it necessary to sealingly contact the interior side of the filter housing. This will ensure that the inflow space can be kept in the preferred size when using replacement filter elements.

According to a preferred embodiment, the filter housing features an oval inner housing cross-section shape. In this case, the filter element can have an oval, however also a kidney-shaped or octagon-shaped cross-section shape. As a result, the use of filter elements that are not compatible can be made particularly difficult.

According to a preferred embodiment, a sealing plate is disposed between filter housing and filter element. This plate features preferably protrusions, which engage in recesses at the filter housing or into the holes. By this measure, a correct positional orientation of the sealing plate is forced in order to achieve a reliable sealing of filter housing and filter element. The sealing plate is, for example, part of the filter element. It is preferably disposed on an end disk or end plate of the filter element or designed as one of these. The shape of the sealing plate is preferably adapted to the shape of the two adjacent housing components, which means to the filter housing and the secondary housing. The sealing plate is preferably provided with an annular sealing, which can be sealingly brought into engagement with a corresponding sealing area of the filter housing. The sealing plate and the associated sealing surface of the filter housing are preferably designed on one narrow side essentially rectangular (in this case, the angles can be rounded), and on the other narrow side in the shape of a semicircle or half of an ellipsis. As a result, a correctly positioned mounting of the filter element can be ensured. Preferably, the annular sealing for sealing the filter element in the filter housing extends along this shape. This is particularly advantageous for a precise signal of the air-flow meter, for it can be ensured that irregularities in the filter element structure are always disposed at the same location in the housing. Such an irregularity can, for example, be the connection point of an annularly closed folded filter bellows.

In one embodiment, inner ribs are provided in the filter housing. These ribs extend in the installation direction of the filter element and reach the inside of the interior space. An accommodated filter element preferably extends then by abutting on the ribs. In this case, the ribs reproduce at least roughly a cross-sectional contour of the respective filter element to be inserted, in particular a cross-section tapering, e.g. in an area of the filter element with a concave arch. Using the ribs avoids using a filter element with a shape other than for the intended use. This will ensure that the inflow space can be kept in the preferred size when using replacement filter elements. The ribs can furthermore serve to homogenize the flow on the outflow side of the filter element and in this case they can in particular advantageously interact with air guide fins, which extend on the clean side into the filter element interior space of the filter element to homogenize and/or calm down the flow.

In a preferred embodiment, the filter element is designed with two convex arches and two concave arches disposed therebetween, so that a central filter interior space area with a constriction and two respective adjacent further central filter interior space areas are created. Air guide fins or air guide blades, e.g. for calming down the flow of the air flowing into the interior space of the filter element, in particular downwards of a cyclone precleaner, can engage or immerse into the other central filter interior space areas. The concave arches can make room for ribs on the housing side. It is, for example, advantageous that an oval housing is used, from which in the area of the concave arches respectively one or several ribs protrude into the interior space of the housing towards the filter element. These ribs extend advantageously along the mounting direction and/or parallel to the folds of the filter element in the space created by the concave arches of the filter element between housing wall and filter element. Preferably, for each concave arch a rib is provided, which is in particular disposed in the center of the concave arch preferably at the narrowest place of the concave arch or the constriction. Due to the ribs, the flow can be homogenized on the outflow side on the exterior side of the filter element, which is beneficial to the quality of the signal of the air-flow meter.

Further possible implementations of the invention comprise also not explicitly mentioned combinations of characteristics described previously or in the following with respect to the examples of an embodiment. In this context, the person of skill in the art will add also individual aspects as improvements or complements to the respective basic form of the invention. The filter according to the invention can not only be used for the filtration of air, but also for the filtration of liquids, in particular of fuel or lubricating oil for an internal combustion engine.

Further embodiments of the invention are subject of the subclaims as well as of the examples of an embodiment of the invention described in the following. Furthermore, the invention is explained in detail based on examples of an embodiment with reference to the attached figures.

BRIEF DESCRIPTION OF THE DRAWINGS

It is shown in.

In the figures, the same reference numerals denote identical or analog components, unless otherwise stated.

DETAILED DESCRIPTION

Figure 1:
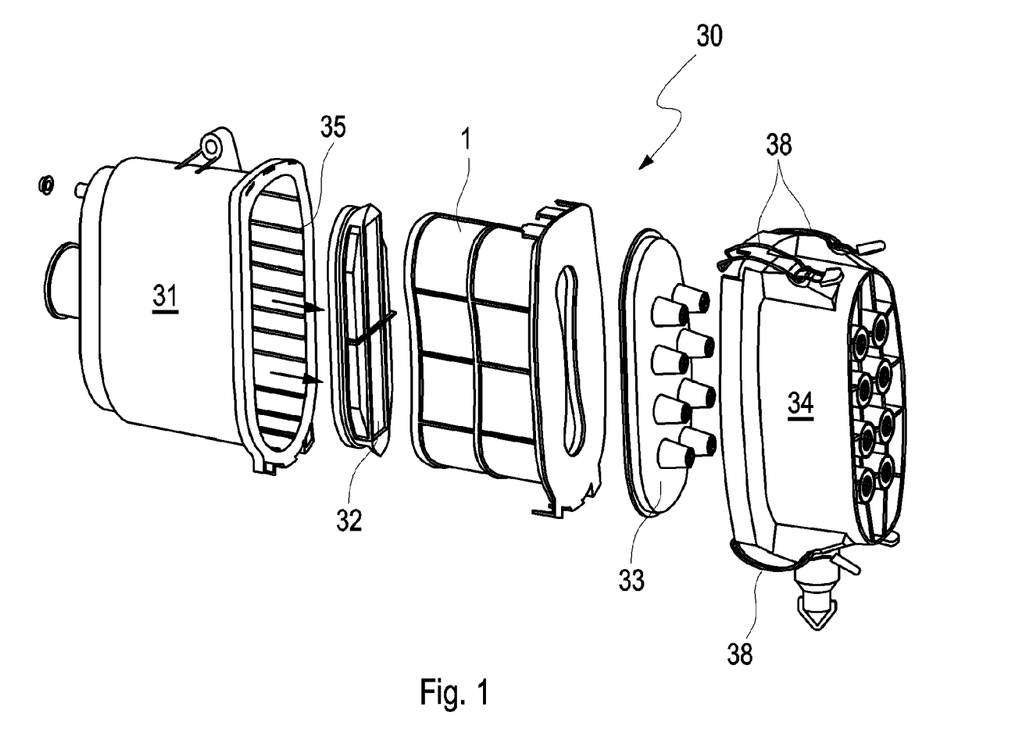
FIG. 1: a schematic exploded view of a two-stage air filter.

FIG. 1 shows a schematic exploded view of a multi-stage air filter or an air filter assembly 30. The cyclone filtration is carried out by an assembly consisting of a cyclone upper section 34 and a cyclone bottom section 33. Air is supplied into the air filter assembly 30 on the side of the cyclone upper section 34. The air is then guided through the filter element 1 represented in the figure to the left of the cyclone bottom section 33 to carry out a further filtration of particles, in particular of fine particles. Furthermore, a secondary element 32 for a further filtration of the through-flowing air is provided downstream of the fluid flow. The air flows through the air filter assembly 30 from the cyclone separator 33, 34, the (main) filter element 1 and the secondary filter element 32. A filter seat for the filter elements 1, 32 and the cyclone bottom section 33 is formed by a filter housing 31, which is completed by the cyclone upper section 34. The cyclone upper section 34 is attached to the housing component 31 by a closing wire clamp 38. In this example of an embodiment, flow stabilizing elements 35 extend from the inside of the housing 31 towards the filter element 1. The flow stabilizing elements 35 are provided on the housing 31 to guide and optimize the flow course of the air in the filter element 1. Although the housing 31 features an outer, more or less oval cross-section, the flow stabilizing elements 35 require that the filter element 1 has convex arches inside, which constrict it towards a filter element interior space. In particular the combination of housing geometry, which imposes the mounting situation for the inserted filter element 1, and the shape of the filter element 1 allow an efficient filtration of the air for an internal combustion engine.

Figure 2:
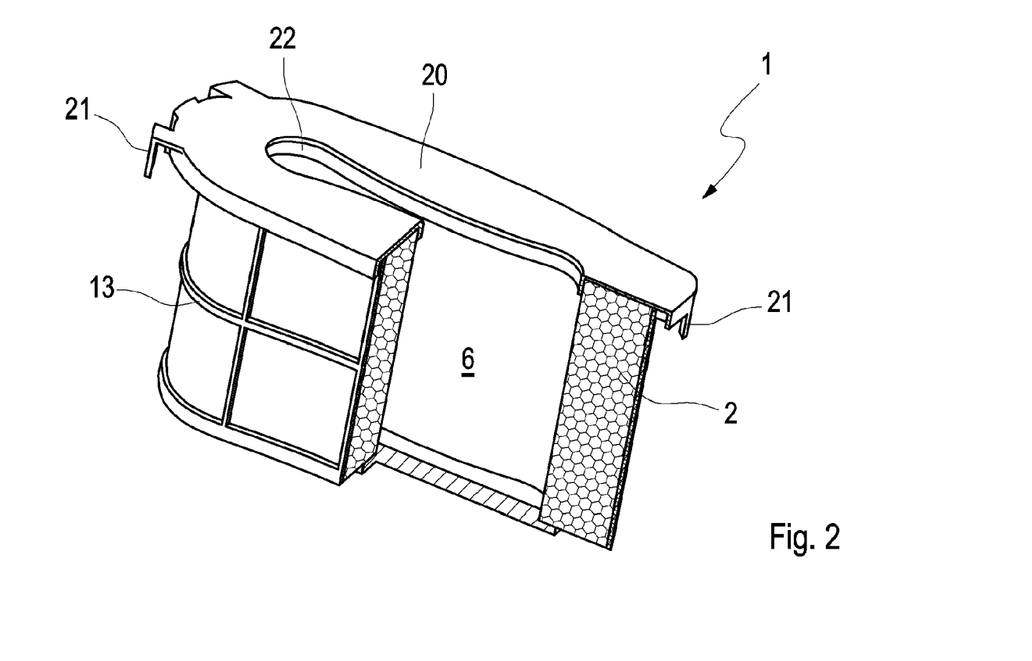
FIG. 2: a schematic perspective sectional representation of a filter element according to a first example of an embodiment.
Figure 3:
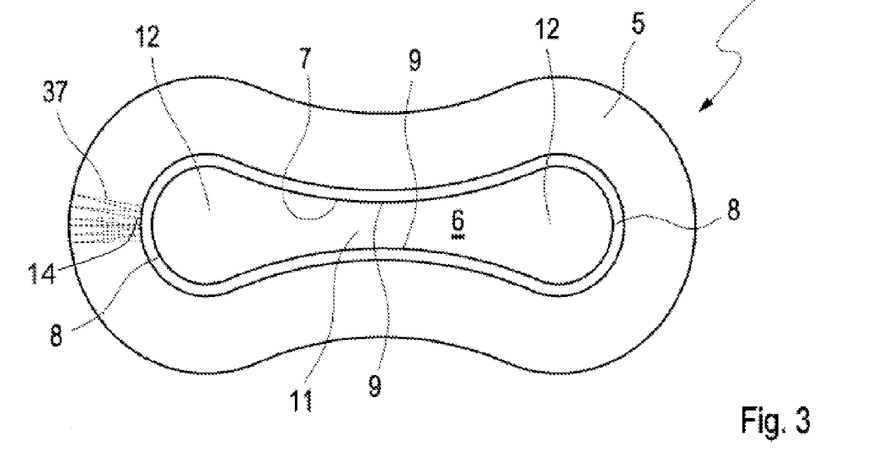
FIG. 3: a schematic cross-sectional representation of a filter medium of a filter element according to the first example of an embodiment.

FIG. 2 shows a schematic perspective sectional representation of a filter element 1 according to a first example of an embodiment. The filter element 1 corresponds to that shown in FIG. 1. The filter element 1 features a tubular filter medium 2, which is formed of a filter paper in this example of an embodiment. The tubular filter medium 2 is shown here in cut representation. In this example of an embodiment, the tubular filter medium 2 forms in accordance with that of FIG. 3 a closed annular cross-section with a filter element interior space 6. It is, as indicated in FIG. 3, possible to design the filter medium as zigzag-folded endless bellows. The foldings or the folding profiles 37 for the surface extension of the filter medium 2 can be recognized. Reinforcing ribs 13 made of a rigid synthetic material are provided on the tubular filter 2 to stabilize its shape. An end disk 20 is frontally provided on the filter element 1 and sealingly contacts the tubular filter medium 2. The end disk 20 features an opening 22 that ends in the filter element interior space 6 and serves as inflow opening for the air. Furthermore, the end disk 20 features fastening elements 21, locking elements in this example of an embodiment, which serve to attach the filter element 1 to a corresponding counter member of the housing 31.

Figure 2A:
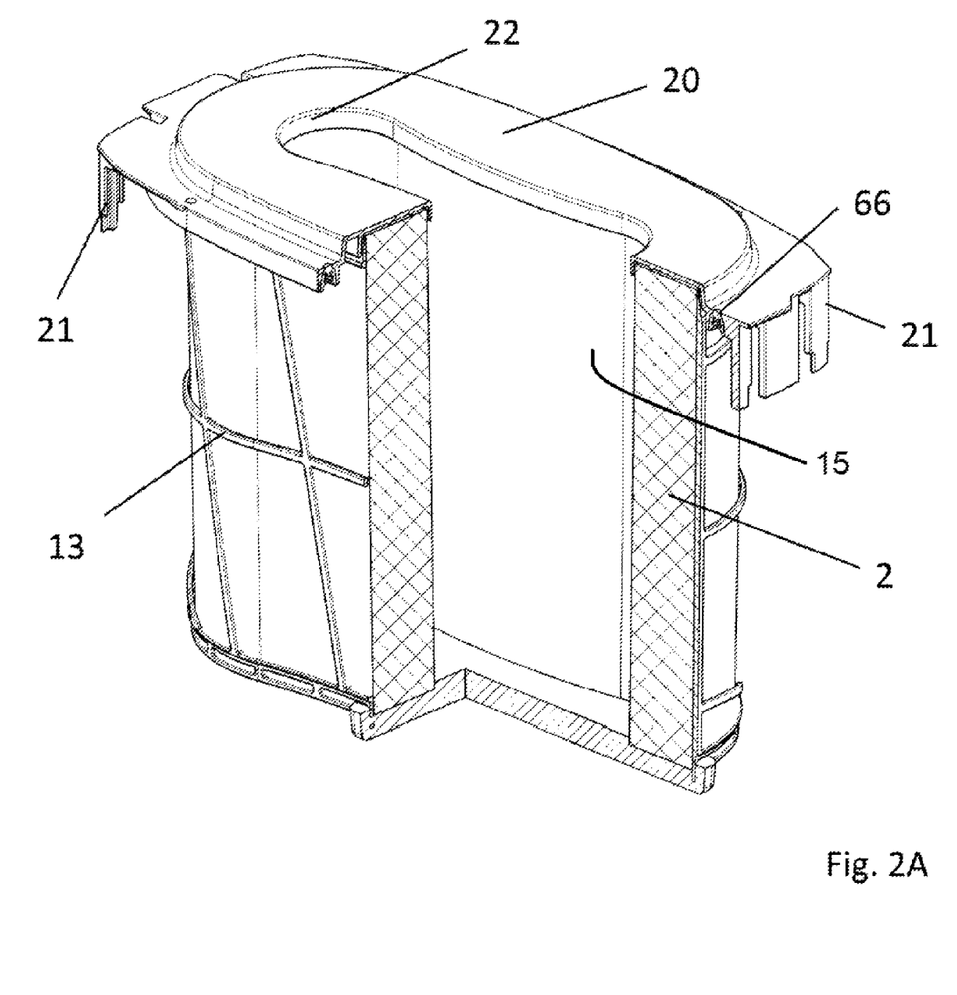
FIG. 2A: an embodiment of a filter element as shown in FIG. 2.

FIG. 2A shows an embodiment of a filter element as shown in FIG. 2. Identical elements and characteristics have the same reference numerals. On the end disk 22, which is disposed on the inflow-sided end of the filter element, on its outflow-sided side, i.e. pointing in the mounting direction of the filter element, a sealing 66 for sealing against the housing is disposed, so that the raw side is separated from the clean side. The sealing 66 can be sealingly brought into engagement with a corresponding sealing area of the filter housing. The end disk 20 and the associated sealing surface of the filter housing can be designed on one narrow side essentially rectangular (in this case, the angles can be rounded), and on the other narrow side in the shape of a semicircle or half of an ellipsis. As a result, a correctly positioned mounting of the filter element can be ensured. As an alternative, as shown here, both narrow sides can also be designed symmetrically in the shape of a semicircle or half of an ellipsis. The correctly positioned mounting can, for example, be ensured in such a way that the fastening elements 21 and also the associated openings on the housing side have a different design on both narrow sides, e.g. a different number or position. This is particularly advantageous for a precise signal of the air-flow meter, for it can thus be ensured that irregularities in the filter element structure are always disposed at the same location in the housing. Such an irregularity can, for example, be the connection point of an annularly closed folded filter bellows.

The filter element may include a layer 15 that abuts on the filter element interior space (6). Filter media fold edges 14 (see FIG. 3) of filter media folds may be arranged on the layer 15.

FIG. 3 shows a schematic cross-sectional representation of a filter medium 2 of a filter element 1. The filter medium 2 has a tubular design with an annular cross-section 5, which encloses a filter element interior space 6 with its internal wall 7. For example, a folded flat filter material 2 is used along the foldings 37. The internal wall 7 extends in the shape of two convex arches 8 between which two concave arches 9 are disposed. Thus, convex arches 8 alternate with concave arches 9. Thus, the opposing internal walls 7 approach each other in the area of the concave arches 9, so that a constriction 11 of the filter element interior space 6 is created. Two large filter element interior space areas 12 with a larger cross-section of the filter element interior space are adjacent to the constriction.

Figure 4:
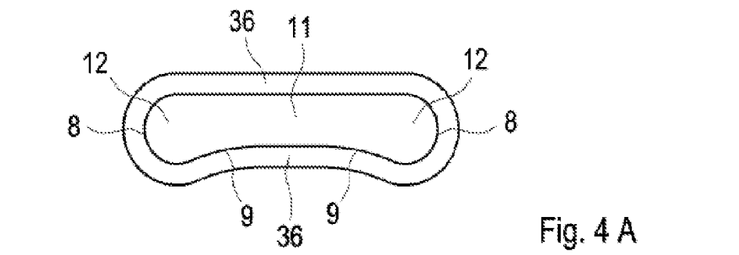
FIGS. 4A, 4B and 4C: schematic diagrams of a filter medium according to further embodiments.

FIGS. 4A-4C show further possible geometries of filter media in top view. The filter medium shown in FIG. 4A has, for example, besides two straight sections 36 two concave arches 9 and two convex arches 8. The concave arches 8 form circular sections, which partially enclose the large filter element interior space areas 12. A constriction 11 is created between the large areas 12. In the filter element shown in FIG. 4B, one concave arch 9 and one convex arch 8, which comprises sub-sections or sub-arches 8A, 8B, 8C, which have each different curvatures, are represented.

Another conceivable geometric embodiment is shown in FIG. 4C. In this case, one concave arch 9 and one convex arch 8 are provided, wherein the constriction 11 is provided in relation to a total width B of the filter element. The embodiment of FIG. 4C has a bean-shaped cross-section It is also possible to call it a kidney- or cucumber-shaped cross-section. In this respect, a constriction in particular relative to the representation of FIG. 4C denotes an area of the filter element, the width of which is smaller than the maximum width expansion of the filter element.

Figure 5:
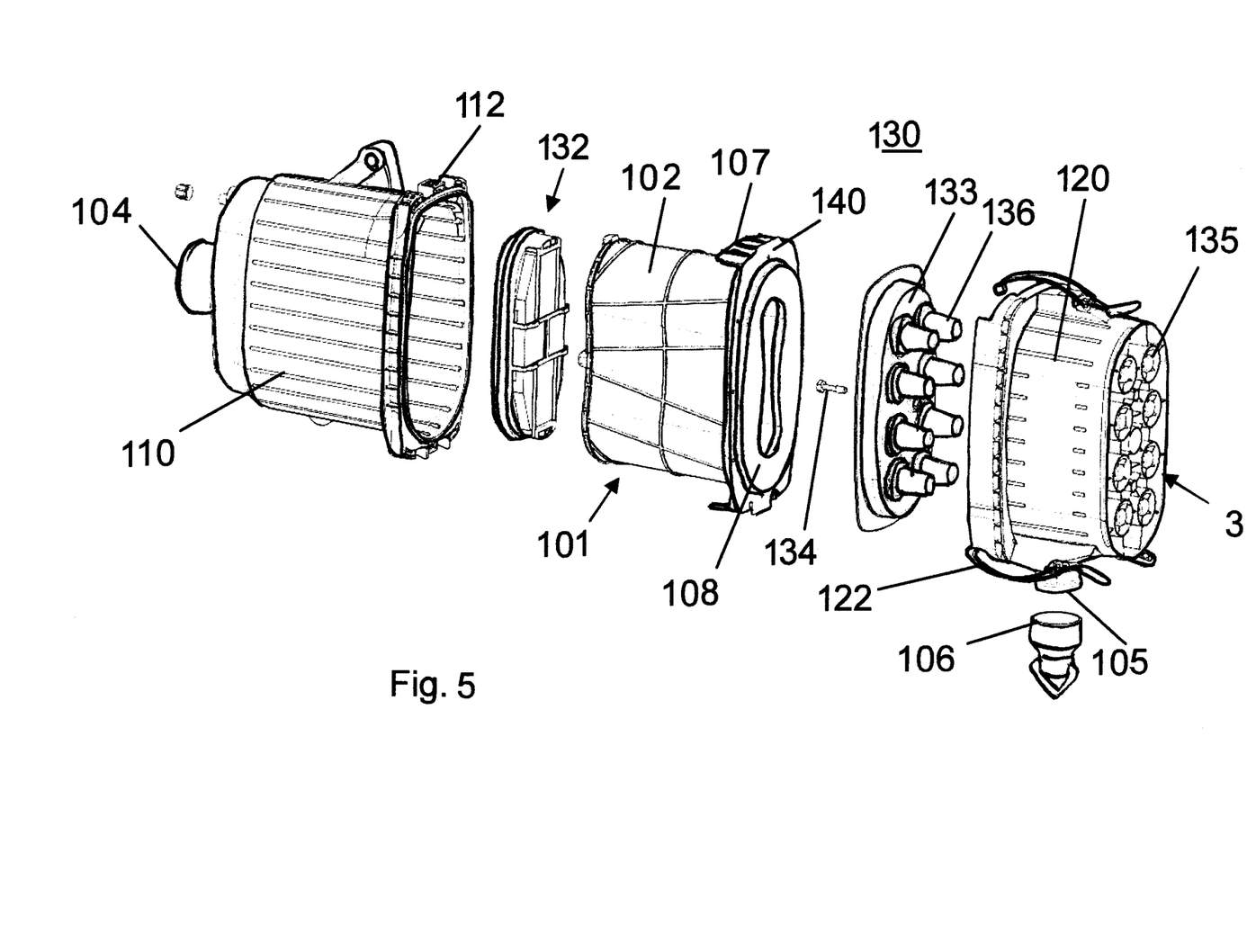
FIG. 5: a schematic perspective exploded view of an air filter with a filter housing and filter element according to a first example of an embodiment.
Figure 6:
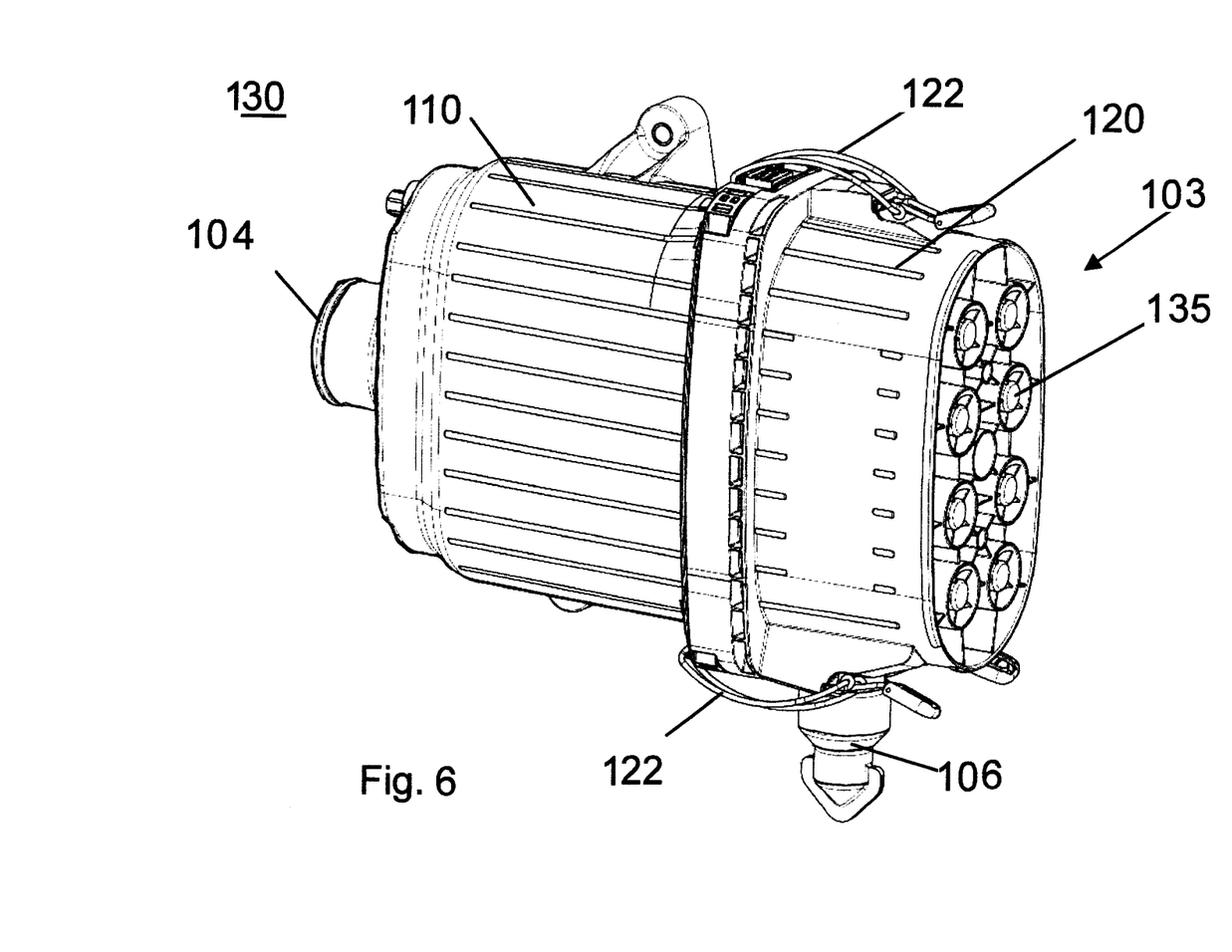
FIG. 6: a schematic perspective representation of the air filter in assembled state according to the example of an embodiment in FIG. 5.

FIG. 5 shows a schematic perspective exploded view of an air filter 130 with a filter housing 110 and filter element 101 according to a first example of an embodiment. FIG. 6 shows the air filter 130 in an assembled state. In the orientation of FIGS. 5 and 6, the air to be cleaned flows from the right to an inlet 103, flows through the multi-stage filter chain, which is called air filter 130, and exits from an outlet 104 at the left in cleaned condition. The cyclone separation is carried out by an assembly consisting of a cyclone upper section, which is called secondary housing 120 in the following, and a cyclone bottom section 133. Several immersion tubes 136, which cooperate with individual centrifugal force separators 135 at the secondary housing 135, can be recognized at the cyclone bottom section 133. The cyclone bottom section 133 is hold by means of a fastening element, for example a screw 134, at the cyclone upper section or secondary housing 120. As secondary housing 120 can also be conceived: cover plates, intake grilles and/or housing covers, in particular with inlets and outlets.

Raw air is supplied at the inlet 103 into the air filter 130 on the side of the cyclone upper section 120. The cyclone separation removes coarse particles from the air, which are collected in the bottom section of the secondary housing 120. A particle removal opening 105, which is closed by a valve 106, is provided. The accumulated particles can be removed in predefined maintenance intervals, however, the valve can also be opened manually.

The air is then guided through the filter medium 102 of the filter element 101 represented in the figure to the left of the cyclone bottom section 133 to carry out a further filtration of particles, in particular of fine particles. A further filter element is provided downstream as secondary element 132. The air is additionally filtered by means of the secondary element 132 and exits at the outlet 104 of the filter housing 110 as filtered air.

The filter element 101 features at the top end a sealing end disk 108, which has several fastening elements 107 in the shape of protrusions or buttstraps. Openings or holes 112 are disposed in the filter housing 110, into which can engage the protrusions 107. Once the filter element 101 is accommodated in the filter housing 110, that means if they are in FIG. 5 completely telescoped essentially in horizontal direction, the protrusions 107 engage into the holes 112. In this case, the protrusions 107 in the area of the holes 112 are so long that they protrude in the orientation of FIG. 5 in the picture to the left from the holes 112 of the filter housing 110. The openings 112 are provided outside of the filter housing 110 and do not create an access to the interior space of the air filter 130. In this case, the filter element 101 is disposed particularly with its end disk 108 between the filter housing 110 and the secondary housing 120.

Locking elements 122, which are attached to the secondary housing 120 in the form of wire clamps in this example of an embodiment, can then engage into the protrusions 107 where they protrude from the filter housing 110, so that the filter element 101 can then be clamped between the secondary housing 120 and the filter housing 110.

Figure 7:
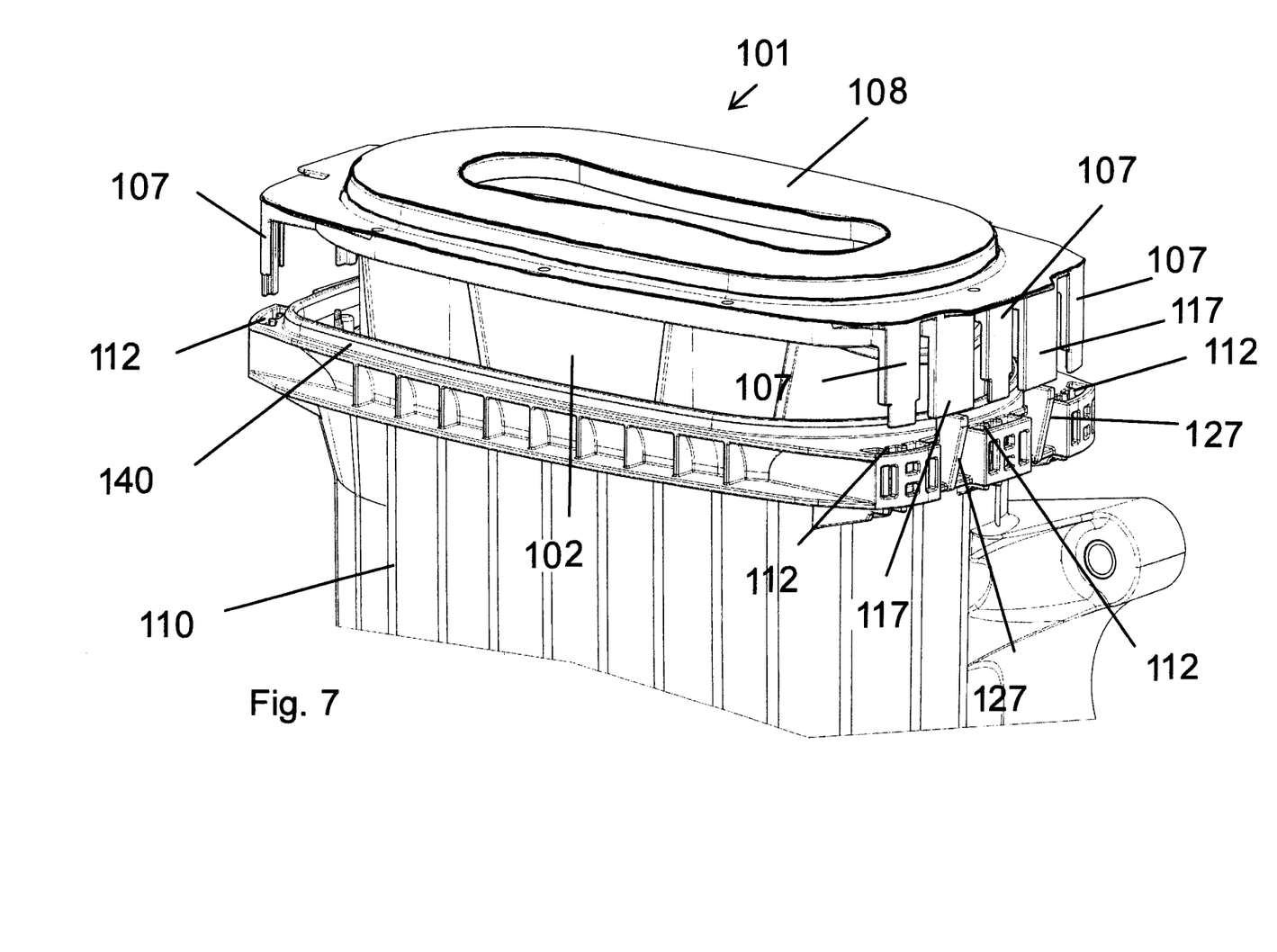
FIG. 7-9: schematic perspective sectional representations of the air filter according to the example of an embodiment in FIG. 5.
Figure 8:
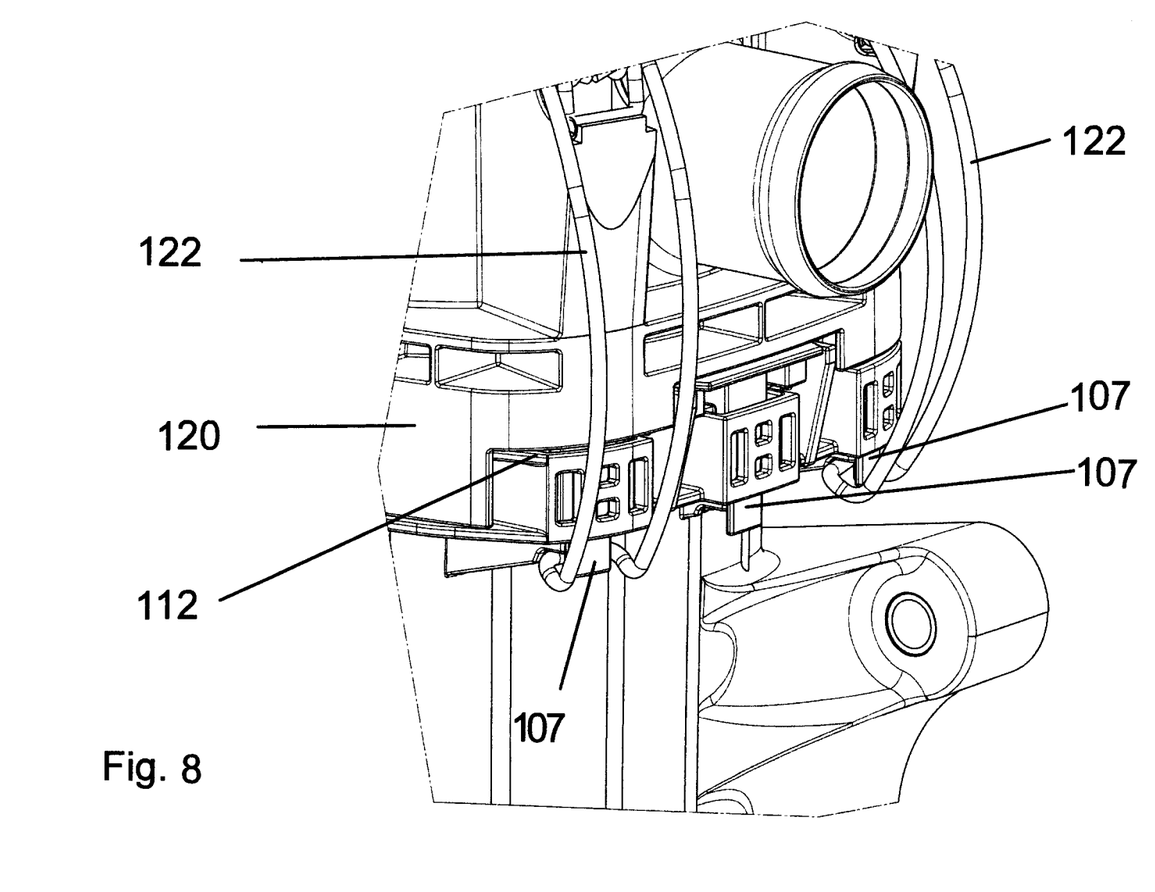
Figure 9:
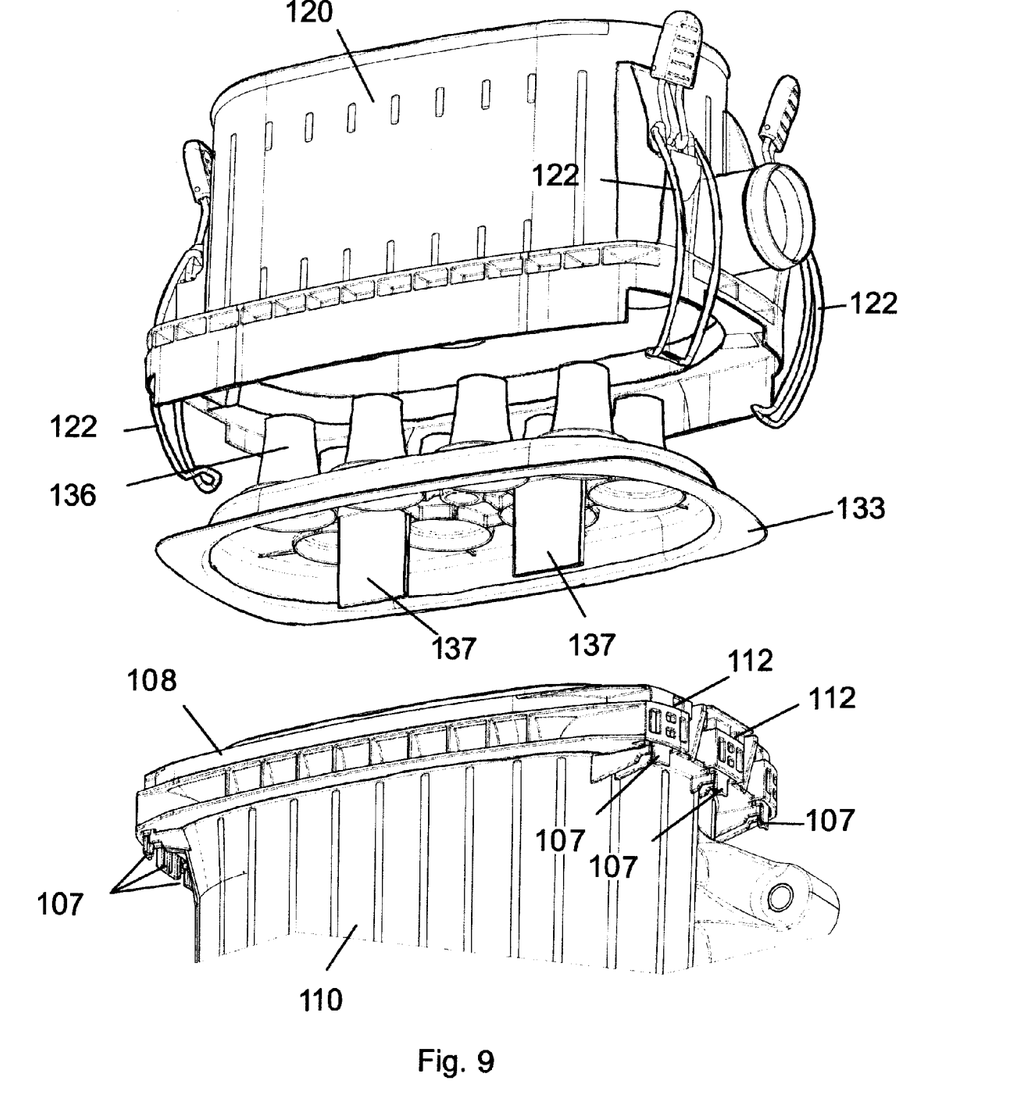

FIGS. 7-9 show schematic perspective sectional representations of a filter housing 110 and secondary housing 120 with accommodated filter element 101 according to the example of an embodiment in FIG. 5. In the orientation of FIGS. 7-9 at the top is represented the secondary housing 120 with the (hidden) cyclone separators and below the filter housing 110. Between the secondary housing 120 and the filter housing 110 are disposed the cyclone bottom section 133 and the end plate 108 of the filter element 101. Protrusions 107 can be recognized from the filter element 101 or the end plate 108, for the filter element 101 is accommodated in the filter housing 110. It can be seen in FIG. 7 that protrusions 107 are, on the one hand, provided for being inserted through the holes 112 at the filter housing 110, and that, on the other hand, further protrusions 117 are provided. The protrusions 107 extend through the openings 112 in the filter housing 110. For the further protrusions 117, there are no associated openings at the filter housing 110 on the right side in the orientation of FIG. 7. On the other hand, blocking ribs 127 are provided on the exterior side of the filter housing 110, which prevent the filter element 1 from moving downwards. In case the mounting orientation is not used as intended, the filter element 101 can not be accommodated completely in the housing 110. This ensures that the sealing end disk 108 is accurately placed onto the edge 140 of the filter housing 110 and that it can close fluid-tightly.

The FIGS. 8 and 9 show the assembly according to the intended use of filter element 101 and housing components 110, 120. The locking element 122 attached to the secondary housing 120, which is realized in this example of an embodiment as wire clamp or bracket, clamps the secondary housing 120 and in particular the cyclone bottom section 133 against the filter housing 110 with the filter element 101 therebetween. A slipping of the locking element 122 at the filter housing 110 is prevented by allowing the locking element to engage behind the respective protrusion 107 and to hold the grip. Thus, the respective protrusion 107, which is provided on the filter element 101, allows in cooperation with the openings 112, that the secondary housing 120 can be clamped with the filter housing 110 by means of the locking elements 122. If third-party filter elements 101 are used, which do not feature the protrusions 107 or have them at another position, the locking elements 122 slip off the filter housing, and the permanent connection of secondary housing 120 and filter housing 110 is prevented. As a result, the improper use of inappropriate filter elements 101 can be prevented.

Furthermore, FIG. 9 illustrates that two blades 137 on the cyclone bottom section 133 besides the immersion tubes 136 towards the secondary housing 120 extend into the direction of the filter element 101 into the interior space. The blades 137 are designed such that, with suitable filter elements 101, they engage exactly into the gaps in the filter medium 102. Otherwise, an inappropriate filter element blocks the assembly of the air filter 130. Due to the blades 137, the air exiting the cyclones can be calmed down on its way to the filter element 101, so that a homogeneous oncoming flow of the filter element can be achieved.

Figure 10:
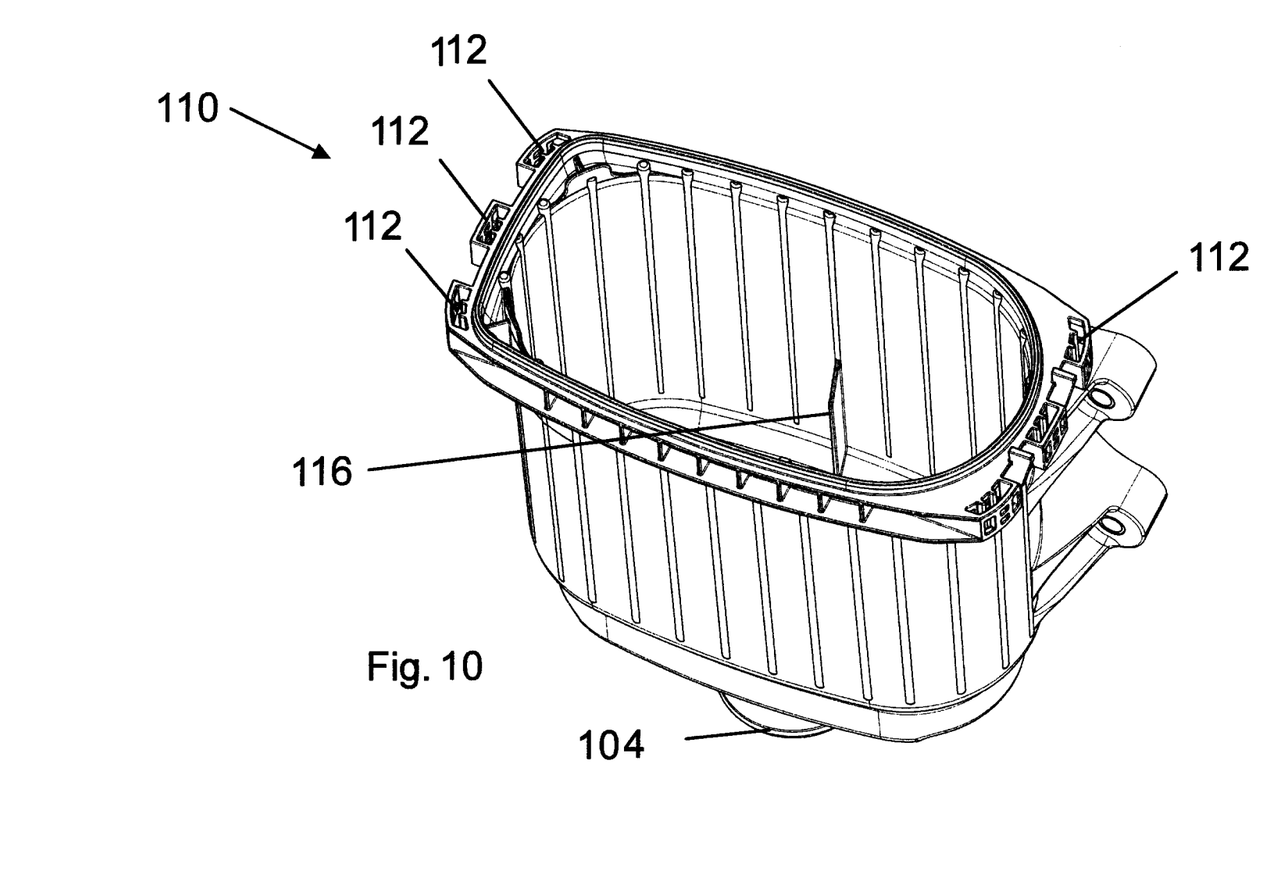
FIG. 10: a perspective representation of a filter housing.

FIG. 10 shows a perspective view of the filter housing 110 with view into the interior space. Inner ribs 116 are provided on the filter housing 110. These ribs 116 extend in the installation direction of the filter element 101 and reach the inside of the interior space. An accommodated filter element 101 extends then by abutting on the ribs 116. The ribs 116 reproduce a cross-sectional contour of the respective filter element to be inserted. Using the ribs 116 avoids using a filter element with a shape other than for the intended use. This will ensure that the inflow space can be kept in the preferred size when using replacement filter elements. The ribs 116 can furthermore serve to homogenize the flow on the outflow side of the filter element and in this case they can in particular advantageously interact with with the blades 137.

Figure 11:
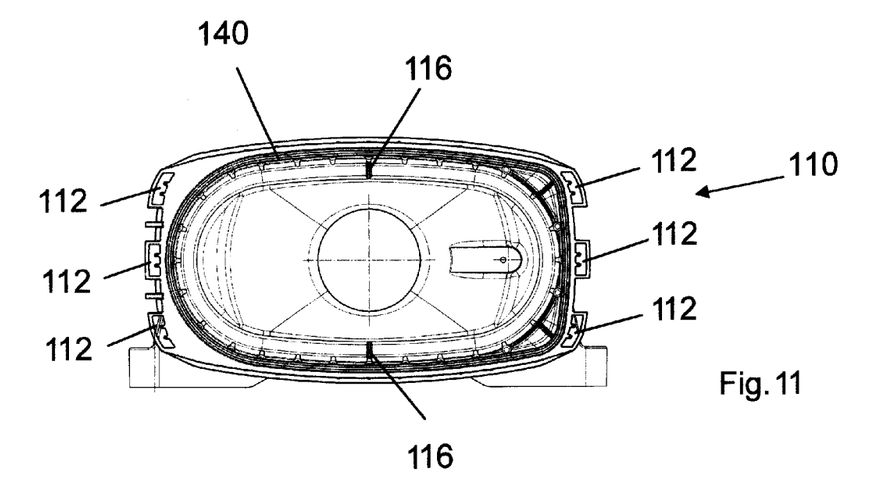
FIGS. 11 and 12: top views of examples of an embodiment of the filter housing and filter element.
Figure 12:
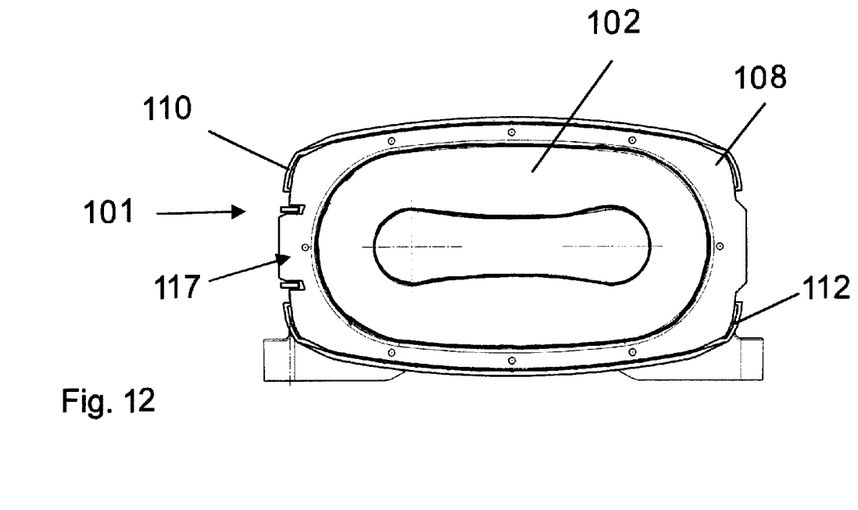

FIG. 11 illustrates the filter housing 110 in top view, and FIG. 12 an appropriate filter element 101, which is inserted into the filter housing 110. The ribs 116 and the shape of the filter element 101 with its filter medium 102 are adapted to each other in such a way that exclusively provided filter elements can be completely accommodated in the filter housing 110 as a type of a key-lock principle. Furthermore, the top view shows that the further protrusion 117 will not be blocked by a blocking element 127 (cf. FIG. 7), if the filter element 1 is correctly oriented in relation to the filter housing 110. In this case, the end disk 108 has a shape adapted to the sealing edge 140. In this way, a good seal seat is necessarily achieved.

Although the present invention has been described above by means of preferred examples of an embodiment, it is not limited thereto, but it can be modified in various ways. In particular, filter element and housing can also be adapted to other filter types than cyclone filters or equipment. It is also conceivable to provide three or more than four buttstraps for clamping the housing components.

Although the present invention has been described above by means of preferred examples of an embodiment, it is not limited thereto, but it can be modified in various ways.

The invention claimed is:

1. An air filter element for an air filter, the air filter element:
    wherein the filter element is a tubular filter medium having a ring-shaped annular cross section which encloses a filter element interior space, the tubular filter medium having an end disk secured on a first axial end of the tubular filter medium;
    wherein the tubular filter medium of the filter element is circumferentially formed in the shape of at least two convex arches and at least one concave arch;
    wherein adjacent to the filter element interior space, an interior wall is arranged which extends in the shape of the at least two convex arches and the at least one concave arch of the tubular filter medium;
    wherein the concave arch is disposed between the two convex arches such that in the area of the concave arch a constriction of the filter element interior space is formed, onto which two larger filter element interior space areas are adjoiningly and oppositely positioned;
    wherein the filter element includes reinforcing ribs abutting the tubular filter medium and holding the form of the tubular filter medium in the shape of the at least two convex arches and the at least one concave arch;
    wherein the tubular filter medium comprises multiple overlaid layers of paper or fleece.

2. The air filter element according to claim 1, wherein the filter element end disk sealingly contacts the annular cross-section of the first axial end of the filter medium, the end disk having an flow opening extending axially through the end disk and opening into the interior space of the filter element.

3. The air filter element according to claim 2, wherein the end disk includes fastening elements embodied as locking elements attaching the filter element to an air filter housing component.

4. The air filter element according to claim 1, wherein the tubular filter medium has a material thickness essentially constant around its circumference.

5. An air filter housing for internally accommodating a filter element according to claim 1, the air filter housing including:
    at least one flow stabilizing element arranged on an interior wall of the filter housing, the at least one flow stabilizing element formed as at least one elongated axial rib formed on an interior surface of an outer wall of the filter housing, the at least one flow stabilizing element extending axially between an open axial end of the housing and a bottom end of the filter housing, the at least one flow stabilizing element extending radially inwardly from the outer wall towards a concave arch of the filter element, when the filter element is accommodated in the housing;
    wherein the air filter housing has on it open axial end, at least one axially extending protrusion receiving opening formed on a radial outer wall of the filter housing.

6. Air filter with an air filter housing according to claim 5 and a filter element at least partially accommodated in the housing,
    wherein the filter element is a tubular filter medium having a ring-shaped annular cross section which encloses a filter element interior space, the tubular filter medium having an end disk secured on a first axial end of the tubular filter medium;
    wherein the tubular filter medium of the filter element is circumferentially formed in the shape of at least two convex arches and at least one concave arch;
    wherein adjacent to the filter element interior space, an interior wall is arranged which extends in the shape of the at least two convex arches and the at least one concave arch of the tubular filter medium;
    wherein the concave arch is disposed between the two convex arches such that in the area of the concave arch a constriction of the filter element interior space is formed, onto which two larger filter element interior space areas are adjoiningly and oppositely positioned;
    wherein the filter element includes reinforcing ribs abutting the tubular filter medium and holding the form of the tubular filter medium in the shape of the at least two convex arches and the at least one concave arch.

7. The air filter according to claim 6, wherein
the filter element end disk sealingly contacts the annular cross-section of the first axial end of the filter medium, the end disk having an flow opening extending axially through the end disk and opening into the interior space of the filter element;

wherein the end disk includes axially extending fastening elements extending radially over an outer surface of the filter element, the fastening elements embodied as locking elements received into complimentary at least one axially extending protrusion receiving opening formed on a radial outer wall of the filter housing.

8. An air filter element for an air filter, the air filter element:
wherein the filter element is a tubular filter medium having a ring-shaped annular cross section which encloses a filter element interior space, the tubular filter medium having an end disk secured on a first axial end of the tubular filter medium;

wherein the tubular filter medium of the filter element is circumferentially formed in the shape of at least two convex arches and at least one concave arch;

wherein adjacent to the filter element interior space, an interior wall is arranged which extends in the shape of the at least two convex arches and the at least one concave arch of the tubular filter medium;

wherein the concave arch is disposed between the two convex arches such that in the area of the concave arch a constriction of the filter element interior space is formed, onto which two larger filter element interior space areas are adjoiningly and oppositely positioned;

wherein the filter element includes reinforcing ribs abutting the tubular filter medium and holding the form of the tubular filter medium in the shape of the at least two convex arches and the at least one concave arch;

wherein the annular cross-section of the tubular filter medium includes a plurality of protrusions or fold edges, which extend into the filter element interior space.

9. The air filter element according to claim 8, wherein
the tubular filter medium is a multilayer filter medium; and
the protrusions or fold edges are disposed on a layer that abuts on the filter element interior space.

* * * * *